Nov. 22, 1960
L. QUINONES ET AL
2,960,787
ORNAMENTED SPECTACLES
Original Filed Sept. 16, 1952
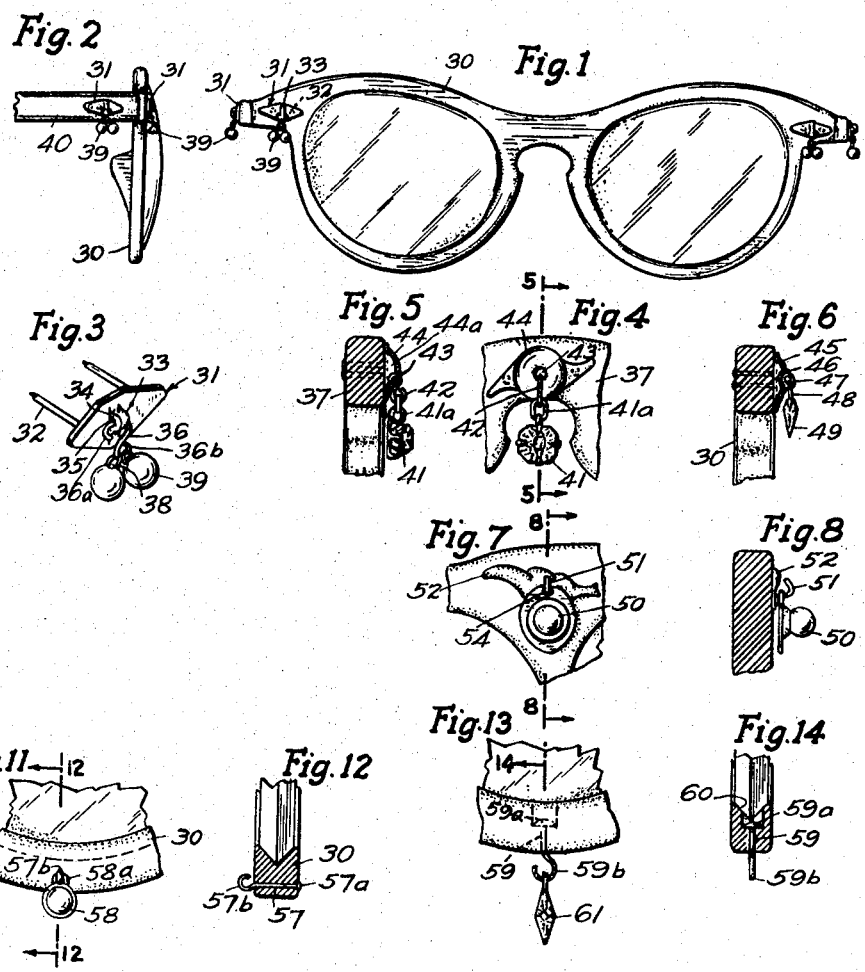
Inventors
*Luis Quinones
Ramon Rodriguez*
By *Harry Jacobsen*
Attorney Nov. 22, 1960
L. QUINONES ET AL
2,960,787
ORNAMENTED SPECTACLES
Original Filed Sept. 16, 1952
2 Sheets-Sheet 2
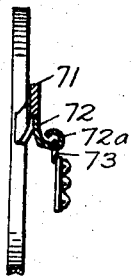
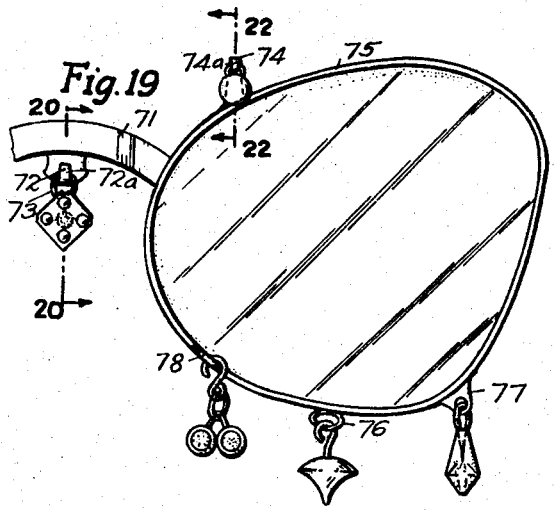
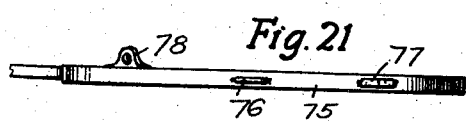
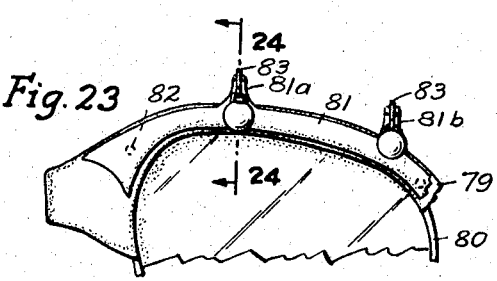
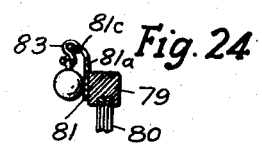
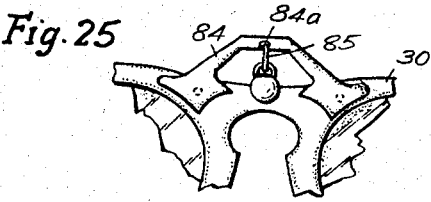
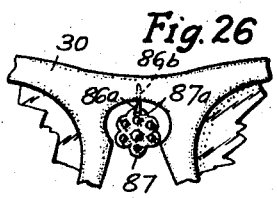
Inventors
Luis Quinones
Ramon Rodriguez
By Harry Jacoban
Attorney

United States Patent Office 2,960,787
Patented Nov. 22, 1960

2,960,787

ORNAMENTED SPECTACLES

Luis Quinones, 405 E. 92nd St., New York, N.Y., and Ramon Rodriguez, 273 W. 70th St., New York 23, N.Y., assignors of thirty-three percent to Harry Jacobson, New York, N.Y., thirty-three percent to said Quinones, thirty-three percent to said Rodriguez, and one percent jointly Original application Sept. 16, 1952, Ser. No. 309,756, now Patent No. 2,766,541, dated Oct. 16, 1956. Divided and this application Oct. 3, 1956, Ser. No. 613,752

7 Claims. (Cl. 41—34)

This invention relates to ornamented spectacles and particularly to the means for mounting an ornament to act as a pendulum and to dangle from the spectacles.

The invention contemplates the provision of one or more suspended ornaments applied to the spectacles in as ornate or as simple a fashion as desired to meet the individual taste of the wearer, the ornament being dangled from the spectacles and vibrating relatively thereto like a pendulum on movement of the spectacles and thereby being prominently displayed as when the head of the wearer of the spectacles is moved, the mounting being such that normal vision is undisturbed while the lowermost end of the ornament is completely free, excessive swinging movement of the ornament being prevented by controlling the length thereof.

A few typical examples of practical embodiments of the invention have been illustrated herein and will be described, it being understood that any one of the various types of suspending means may be employed with any one of the various types of ornaments or spectacles shown and at any of the points of suspension illustrated.

The various objects of the invention will be clear from the description which follows and from the drawings, in which—

Fig. 1 is a front elevational view of a typical pair of plastic spectacles showing dangling ornaments suspended as pendulums from the temples and from the temporal ends of the spectacle front.

Fig. 2 is a side elevational view thereof with part of the temple broken away.

Fig. 3 is a perspective view of the ornament-suspending means shown in Fig. 1.

Fig. 4 is a fragmentary elevational view of the bridge portion of a pair of spectacles showing a perforated metallic suspending member serving as a surface ornament.

Fig. 5 is a vertical sectional view thereof taken on the line 5—5 of Fig. 4.

Fig. 6 is a similar view of a modified form of the ornamental suspending member permanently securing the dangling ornament to the spectacles.

Fig. 7 is a fragmentary elevational view of the temporal end portion of a spectacle front showing a modified form of the suspending ornament removably suspending a perforated dangling ornament.

Fig. 8 is a vertical sectional view thereof taken on the line 8—8 of Fig. 7.

Fig. 11 is a fragmentary elevational view of part of a spectacle lens frame showing a modified form of the means for suspending an ornament.

Fig. 12 is a vertical sectional view thereof taken on the line 12—12 of Fig. 11.

Fig. 13 is a view similar to Fig. 11 showing another form of the means for suspending an ornament.

Fig. 14 is a vertical sectional view thereof taken on the line 14—14 of Fig. 13.

Fig. 19 is a fragmentary front elevational view of a metallic spectacle frame showing five different ornament suspending members, any one or more of which may be employed in one frame.

Fig. 20 is a vertical sectional view thereof taken on the line 20—20 of Fig. 19.

Fig. 21 is a bottom plan view of the lens frame portion of Fig. 19.

Fig. 22 is a fragmentary vertical sectional view taken on the line 22—22 of Fig. 19.

Fig. 23 is a fragmentary front elevational view of a lens frame showing an elongated suspending member in the form of an eyebrow ornament and provided with several extensions.

Fig. 24 is a fragmentary vertical sectional view thereof taken on the line 24—24 of Fig. 23.

Fig. 25 is a view similar to Fig. 4 showing an upwardly extending suspending member at the bridge.

Fig. 26 is a similar view showing a permanently attached suspending member in the form of a hook in connection with a perforated dangling ornament.

In the various forms of the invention illustrated herein by way of example, the ornament is pivotally mounted at a selected point of the spectacle frame (which frame as the word is used herein is intended to include the temples) so that the ornament dangles therefrom and vibrates relatively to its supporting means on movement of the latter, as when the spectacles are in place on the head, and the head is moved. If the ornament is a jewel or imitation thereof, the glitter is emphasized by such movement and attention attracted thereto. In all forms of the ornament and its suspending means, the ornament is arranged at all times outwardly beyond the lens of the spectacles and hence does not interfere with normal vision, though in some cases the ornament may swing against and touch the nose or other part of the face of the wearer.

Referring now to Figs. 1 and 2, the frame 30 there shown is provided with temporal ornament-suspending members 31 which may also serve if enlarged, as shields for the hinge rivets 32, which rivets also secure the suspending ornaments to the frame. That part 33 of the material of the member 31 between two parallel slits as 34 is pressed forwardly out of the plane of the remainder of the member to provide a hole or opening or space 35 for the reception of one part as 36a of a suitable hook such as the S-hook 36 to suspend said hook pivotally and removably from the member. The other end part 36b of the hook may be an eye permanently holding the links 38 secured to the relatively weighty jewel ornaments 39, or the hook may terminate in an open eye or loop permitting removal of the dangling ornament 39 and the substitution of another therefor. Similarly, if the upper part 36a is to be permanently attached to the suspending member 31, said part 36a is closed to form a closed eye instead of an open hook as shown. The rivets 32 pass through the frame 30 to be clinched on the rear face of the frame in the usual manner, or said rivets may pass through the holes usually provided in one leaf of the temple hinge to be clinched on said leaf in a well known manner. In this case, the dangling ornament is outside of the frame and unless swung violently, does not touch the face. When the head is moved, changeable light effects are produced by the jewels with consequent glitter accentuated by the vibration or pendulous movement of the ornament. The temple part 40 instead of the front part of the frame may carry the suspending member 31 and its ornament 39, or both the temple and front may support such ornaments if more elaborate embellishment is desired. A slitted suspending ornament with a pressed out holding member 33 may obviously be used anywhere on the frame where there is room therefor, if desired.

The ornament may be suspended at the nose bridge instead of or in addition to those carried by the front and temple. In Figs. 4 and 5 is shown a dangling ornament 41 on the chain link 41a which is removably or permanently mounted on the S-hook 42. The upper end of the hook is passed through a hole 43 in the bridge ornament 44 which is riveted to the front face of the bridge 37. Being generally convex, the perforated part of the ornament 44 stands forwardly away from the surface of the bridge, thereby providing a suitable passage 44a for the reception of the end of the hook which is inserted into the hole 43. In this form of the invention, the dangling ornament may touch the nose. If this is objectionable, such contact may be avoided by the employment of the type of upwardly extending suspending member shown in Figs. 22, 24 and 25 as will later be explained in more detail.

In Fig. 6, the permanently attached suspending member 45 is shown riveted to the frame 30 and provided with an indentation 46 in which is soldered the link 47 receiving the swinging link 48 attached to the dangling ornament 49. This is a simple and relatively inexpensive form of permanent pivotal mounting for the ornament giving a relatively small amplitude of swinging or vibratory movement.

As shown in Figs. 7 and 8, chains, loops or links between the suspending member and the suspended ornament may be omitted and the dangling ornament suspended from an open hook as 51 soldered to the secured frame ornament 52 which is riveted where desired at the temporal end of the spectacle front. The hook 51 is readily passed through the hole 54 of the ornament to attain the desired suspension and swinging movement. Any ornament terminating in a loop, eye or link may be mounted on the hook to replace the ornament 50, as when it is desired to match the color of the wearer's clothes or for more formal occasions.

The suspending member of Figs. 11 and 12 takes the form of a laterally disposed pin 57 passed through the desired point of the frame 30 and headed on the inside as at 57a and terminating in a hook 57b at the outside of the frame and projecting forwardly therefrom. The dangling ornament 58 terminates in a loop 58a which is readily hooked on to and removed from the open hook 57b. If the hook is closed to form an eye after the mounting of the ornament thereon, the ornament becomes permanently attached to the frame and dangles therefrom.

In the modified form of the invention illustrated in Figs. 13 and 14, the suspending pin 59 is arranged radially of the lens frame, the head 59a at the inner end being countersunk or recessed beyond the lens groove 60. At the outer end of the pin is provided the hook 59b arranged to project beyond the outer peripheral surface of the frame instead of beyond the front surface as in Fig. 12. The suspended ornament 61 dangles outside of the frame and avoids interference with vision, the ornament being short enough for that purpose, while the head 59a of the pin does not interfere with the insertion of a lens into the groove 60.

It has been indicated that the invention is applicable to composition frames, to metal frames and to frames of combinations of composition and metal. In Figs. 19 to 22, suspending members peculiarly adapted to metallic frames are shown. For economy of illustration, Fig. 19 shows five different suspending members soldered either to the upper or lower parts of the metallic lens frame or to the metallic bridge. However, only one of such members may appropriately be employed at any desired point and the total number of such members may well be limited to one or two on any one frame.

At the bridge 71, a sheet metal hook 72 is shown depending from the under edge of and soldered to the bridge and terminating in an upwardly turned hook or eye 72a from which the ornament loop 73 is suspended in such a manner that it dangles in front of the bridge of the wearer's nose without touching and out of the line of sight.

In Fig. 22, the upwardly extending sheet metal member 74 is shown soldered to the top edge of the lens frame 75 and terminates in a forwardly extending and downwardly turned hook or eye 74a which suspends the ornament above the lens opening of the frame and in front of the lens frame 75. The loop or link 76 constitutes another form of suspending member similar to the loop 47 of Fig. 6, but is soldered directly to the frame 75 at any desired point, preferably at the lower half of the lens frame or to the bridge to avoid interference with normal vision, being small enough to be inconspicuous when the dangling ornament is removed. A perforated sheet metal member 77 functions similarly to the loop 76, and is similarly soldered in place to suspend the ornament, and constitutes another practical form of suspending member. The other modification shown in Figs. 19 and 21 is the perforated suspending member 78 similar to the member 77 but soldered to the front face of the lens frame 75 instead of to the outer peripheral surface of the frame.

In Figs. 23 and 24 is shown a structure whereby a number of ornaments may be suspended in a position above the top of the lens opening and in front of the frame. The frame shown comprises the eyebrow part 79 and the metallic part 80 constituting the eyewire. The ornamental strip 81 is fastened to the part 79 as by the rivets 82 and is provided with the upwardly projecting spaced apart perforated extensions 81a and 81b from which the ornaments are suspended as by means of the S-hooks 83 passed through the perforations 81c.

In Fig. 25, an ornamental upwardly extending member 84 is riveted to the frame and projects above the bridge, being perforated as at 84a to hold a suitable hook or eye 85 and thereby to suspend a dangling ornament above and in front of the bridge and out of contact with the nose of the wearer.

In Fig. 26, a pin constitutes the suspending member. The pin terminates in a hook 86a similar to the hook 59b of Fig. 13, the upright pin shank 86b being threaded into the bridge without passing completely therethrough. The ornament 87 dangles from the hook and projects below the bridge, the hook passing through a perforation 87a of the ornament as in Fig. 8.

It will now be seen that the invention may take a variety of forms wherein a dangling ornament is suspended in any one of a number of ways from any type of spectacle frame and at any point thereof without interfering with vision, and that while certain specific forms of the invention have herein been shown and described, the invention is not limited thereto, and that various changes may be made from the illustrated embodiments of the invention without departing from the spirit thereof as defined in the appended claims.

This application is a division of application Serial No. 309,756, filed September 16, 1952, now Patent No. 2,766,541.

We claim:

1. In combination, a spectacle frame having spaced lens rims each surrounding a lens-receiving opening, having a bridge connecting the rims and having temples sufficiently wide to permit the attachment of an ornament, a non-resilient ornament suspending member having a part projecting sufficiently outwardly of the surface of the frame to maintain the hook hereinafter mentioned in substantial spaced relation to the frame, means securing the suspending member to the frame at a point in proximity to a rim and also in spaced relation to the upper part of the rim, a vertically elongated and relatively narrow ornament member having a free and freely movable lower end portion terminating in a relatively weighty light-reflecting glittering ornament in proximity to a rim and outwardly of the frame, cooperating means on the members securing the upper end of the ornament member movably and removably to the suspending member, said means comprising a hook on one of the members passing through a hook-receiving space in the other of the members whereby the members are separable from each other while the suspending member remains attached to the frame, the ornament hanging vertically from the suspending member in spaced relation to the lens openings and in a position, visible to an observer from points in front of the frame, and out of the normal range of vision of the wearer, movement of the head of the wearer of the frame causing pendulous movement by inertia of the ornament relatively to the frame with resulting changeable light effects continuing after movement of the head has ceased.

2. The combination of claim 1, the suspending member and the frame being metallic, the suspending member being perforated at a point in spaced relation to the frame and being generally planar, and the securing means comprising solder joining the suspending member permanently to the frame.

3. The combination of claim 1, the suspending member projecting above the frame and the upper end of the ornament member being secured to the suspending member at a point above the frame.

4. The combination of claim 1, the ornament being arranged at the bridge to dangle against the nose of the wearer.

5. The combination of claim 1, the suspending member being elongated and substantially coextensive with and covering substantially the entire upper part of the front surface of the rim and being secured to said upper part in a position to conceal said part.

6. In combination with a spectacle frame having spaced apart lens openings, a non-resilient ornament suspending member having a passage therein, means securing the suspending member to the frame in position to arrange the passage in forward spaced relation to the lens openings, a vertically elongated ornament member having a free lower end portion terminating in a light-reflecting ornament, means on the upper end portion of the ornament member entering and cooperating with the passage to suspend the ornament member swingably and removably from the suspending member in a vertical position throughout and forwardly beyond the perimeter of the lens openings and in proximity to the front face of the frame to enable the ornament to swing pendulously by inertia relatively to the frame on movement of the frame and to continue to move after movement of the frame has ceased, said last-mentioned means having a passage therein for the reception of that part of the ornament suspending member adjacent the passage of the ornament suspending member.

7. The combination of claim 6, that part of one of the members entering the passage of the other member being in the form of a hook whereby the ornament member is detachable from the suspending member.

References Cited in the file of this patent

UNITED STATES PATENTS

| D. 152,373 | Schwartz | Jan. 11, 1949 |
| D. 164,228 | Field | Aug. 14, 1951 |
| 2,766,541 | Quinones | Oct. 16, 1956 |

FOREIGN PATENTS

| 924,807 | France | Mar. 17, 1947 |